Figure 1:
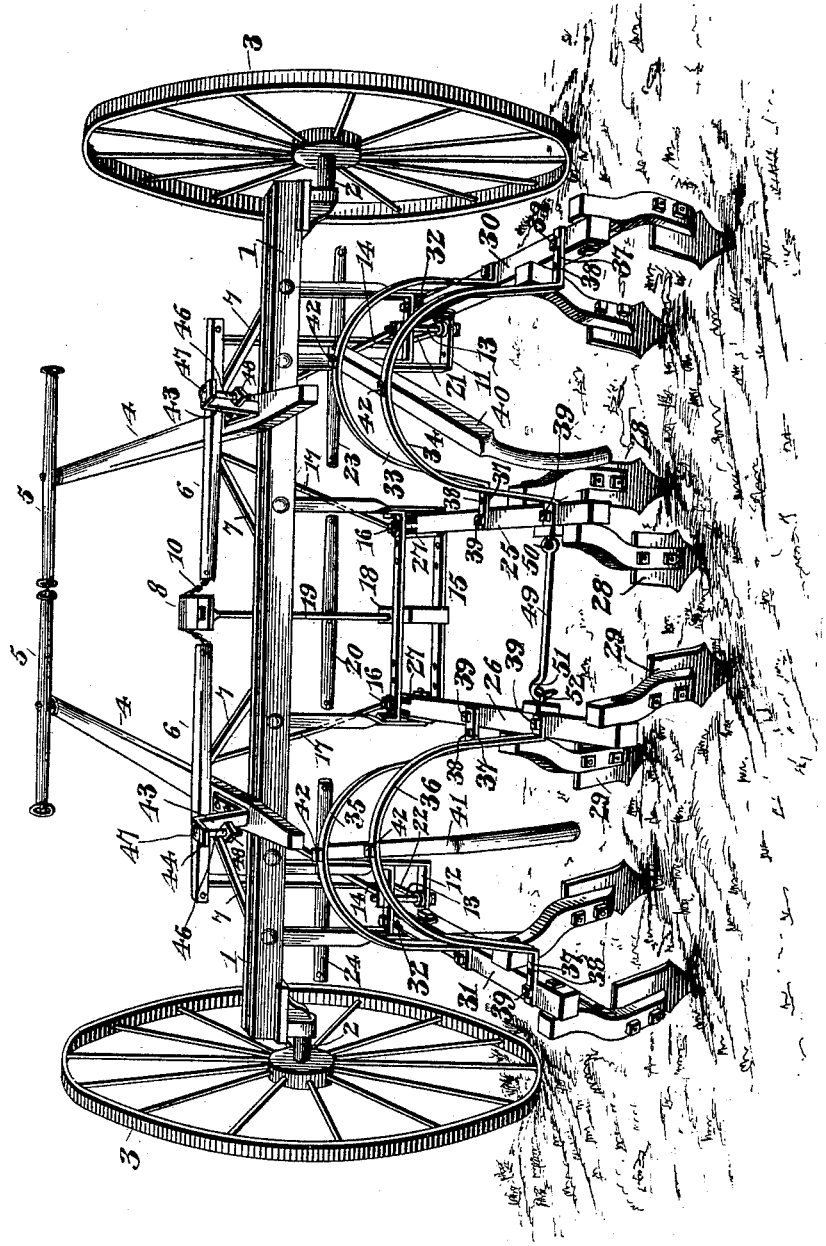

No. 619,183. Patented Feb. 7, 1899.
P. JARVIS.
DOUBLE ROW CULTIVATOR.
(Application filed Nov. 4, 1898.)

(No Model.) 2 Sheets—Sheet 1.

Witnesses
Jas. K. McCathran
H. F. Bernhard

Philip Jarvis Inventor
By his Attorneys,
C. A. Snow & Co.

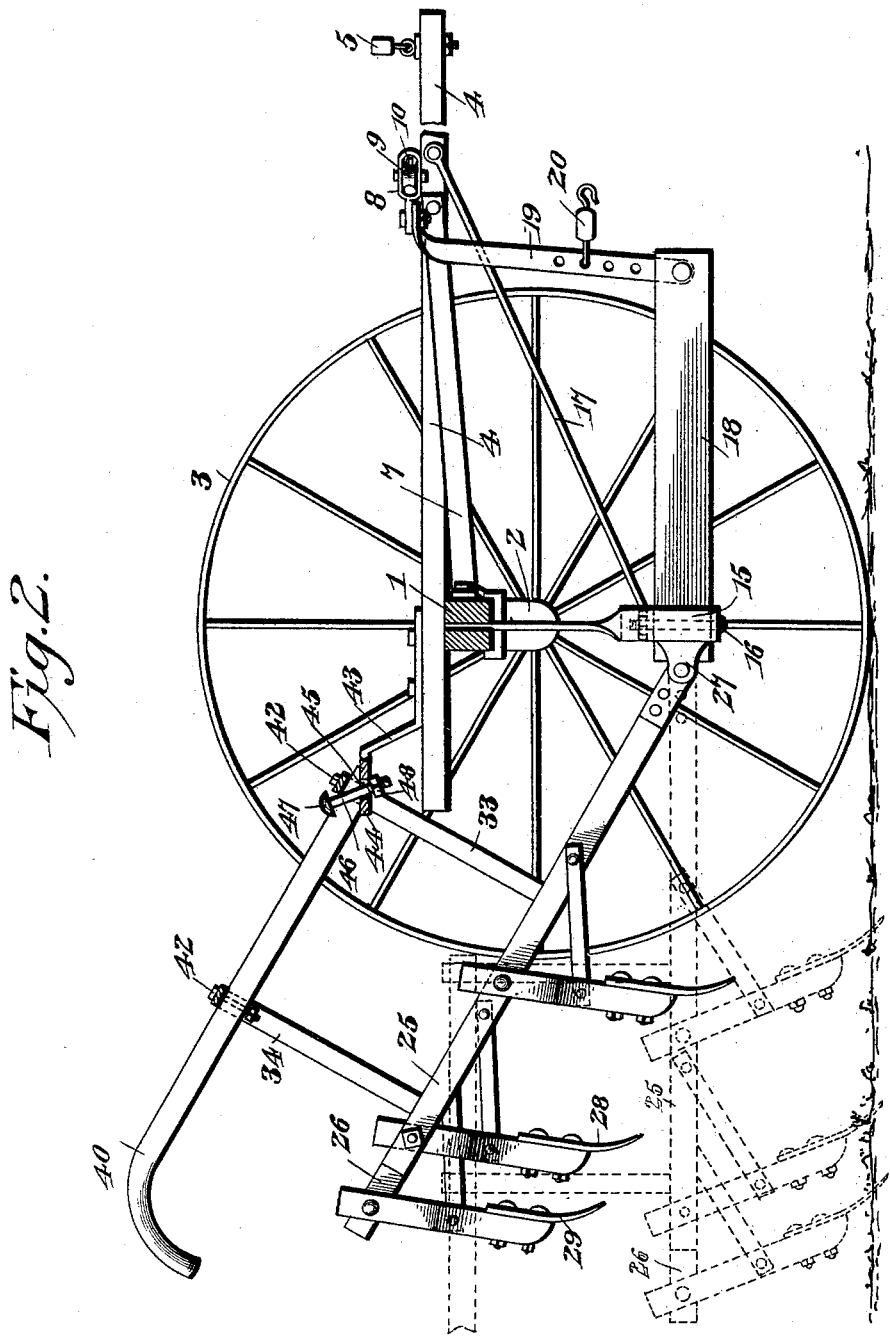

UNITED STATES PATENT OFFICE.

PHILIP JARVIS, OF CEDAR RAPIDS, NEBRASKA.

DOUBLE-ROW CULTIVATOR.

SPECIFICATION forming part of Letters Patent No. 619,183, dated February 7, 1899.

Application filed November 4, 1898. Serial No. 695,473. (No model.)

*To all whom it may concern:*

Be it known that I, PHILIP JARVIS, a citizen of the United States, residing at Cedar Rapids, in the county of Boone and State of Nebraska, have invented a new and useful Double-Row Wheel-Cultivator, of which the following is a specification.

My invention is a double-row wheel-cultivator, and is more particularly designed as an improvement on the cultivator disclosed in United States Letters Patent No. 611,321, issued to me on September 27, 1898.

One of the improvements which I have made consists in the provision of arches which couple the plow-beams in pairs, and each pair of arches has a handle attached loosely thereto, by which the pair of beams may be swung to the right or left, as required, in the cultivation of corn rows, or said beams may be lifted with ease in order to suspend them from the implement-frame.

Another improvement resides in a suspension-bolt adapted to engage with the front arch of a pair of beams in order to hold the parts securely in their raised inoperative positions, and when the arch is disengaged this bolt falls or drops by gravity, so as to be thrown automatically out of position, thus avoiding interference with the arch in lowering the pair of beams by manipulating the handle-bar.

A further improvement contemplated by the present invention resides in having one beam of the inner pair of beams extended rearwardly beyond the other beam, so as to space the rearmost shovels in a manner to secure ample clearance-space between said shovel for the passage of trash and refuse; and the invention further consists in the construction and arrangement of parts, which will be hereinafter fully described and claimed.

To enable others to understand the invention, I have illustrated the same in the accompanying drawings, forming a part of this specification, and in which—

Figure 1 is a perspective view looking at the rear of a wheel-cultivator embodying my improvement, the two pairs of cultivator-beams being lowered to their active positions. Fig. 2 is a longitudinal sectional elevation through the cultivator with one of the beams in its raised position and suspended from the frame, the dotted lines showing the beam lowered.

Like numerals denote like parts in both figures.

The axle 1 is provided at its end with wheel-spindles 2, on which are loosely mounted the carrying-wheels 3. The draft-tongues 4 are secured firmly near their rear ends to the axle 1, and to the front ends of these draft-tongues are loosely attached the neck-yokes 5. The doubletrees 6 are mounted loosely on the tongues in advance of the axle, and said tongues are strengthened by the braces 7, which are fastened to the axle. The doubletrees are loosely connected together at their inner contiguous ends by means analogous to the device shown in my prior patent—that is to say, a pulley-bracket 8 supports a guide sheave or pulley 9, around which passes a chain 10, having its ends fastened to the doubletrees substantially as shown by Fig. 1.

My implement is designed for cultivating two rows of corn at one operation, and to this end I employ four beams, which are coupled in pairs, each pair of beams carrying stocks and teeth arranged to throw the dirt in opposite directions on the two sides of the row. To accommodate the outside beams, I employ the side hangers 11 12, which are fastened securely to the axle 1 near the ends thereof, and each side hanger is provided with a stay-bolt 13, to which is fastened one end of a brace-rod 14, the opposite end of which rod is fastened to one of the draft-tongues. A central hanger 15 is fastened securely to the axle between the side hangers, and this central hanger receives the bolts 16, which provide for the attachment of the braces 17 and serve as the pivots for the swivel-couplings of the two inside shovel-beams. The braces 17 extend from the stay-bolts 16 to the draft-tongues 4.

A short draft-beam 18 is secured to the middle of a central hanger 15, and from this draft-beam extends a rod or bar 19, the upper end of which is fastened to the bracket 8, and this rod or bar 19 supports or carries the central whiffletree 20.

The side draft-bars 21 22 are attached to the side hangers 11 12 and to the outer end of the doubletrees 6, and these draft-bars support the side whiffletrees 23 24, whereby provision is made for hitching three draft-animals to the implement, and the draft appliances are so connected and arranged as to secure distribution of the draft exerted by the animals.

The inner shovel-beams 25 26 are connected at their front ends to the central hanger 15 by the swivel-couplings 27, each of said couplings being fitted to one of the bolts 16 and each coupling being constructed to provide for adjustment of the shovel-beam in a horizontal direction as well as in a vertical direction. The shovel-beam 26 is somewhat longer than the beam 25, so that its rear end extends beyond said beam 25, and to these beams are secured stocks, which carry the shovels 28 29.

The outside draft-beams 30 31 are connected to the side hangers 11 12 by swivel-couplings 32, which also enable the outside beams to be adjusted in horizontal and vertical planes.

The draft-beams are coupled in pairs, each of which consists of one outside beam and one inside beam. One pair of beams are united together by coupling-arches 33 34, secured to the beams at the middle and near the rear end, and the other pair of beams are attached by the coupling-arches 35 36, which are fastened similarly to the first-named arches 33 34. Each arch is provided with short arms 37, and in these arms are the apertures 38, designed to accommodate the bolts 39, which secure the arch to the pair of beams. The pair of beams may be adjusted laterally or sidewise by passing the bolts through different apertures in the arms 37 of the coupling-arches, and the beams are thus adapted to be expanded or contracted to suit the width of the rows. To the arches 33 34 of one pair of beams is connected a handle-bar 40, and to the other pair of arches is attached a handle-bar 41. The handle-bar extends across the bowed or raised portion of its pair of arches, and said bar is attached loosely to the arches by the bolts 42, the handle portion of each bar extending well to the rear of the arches, so that the operator, who walks between the rows, is enabled to manipulate the handle-bar, by which the two pairs of shovel-beams may be controlled. It will be understood that the outside beams 30 31 are equipped with stocks, which carry shovels arranged to throw the soil upon the rows.

Each pair of beams, united together by the arches and equipped with a handle-bar, is adapted to be raised to the inactive position represented by full lines in Fig. 2, and when thus elevated the pair of beams is adapted to be suspended by a crane 43 and a suspension-bolt, to be described presently. There are two of these cranes provided for suspending the two pairs of shovel-beams, and these cranes are secured firmly to the rear ends of the draft-tongues, as shown more clearly by Fig. 2. Each crane has a rearwardly-extending horizontal arm 44, in which is provided a vertical aperture 45. The suspension-bolt 46 is fitted loosely in this aperture of the crane-arm, and this bolt is provided with a head 47 and with a nut 48, that serve to limit the vertical play of the bolt in the aperture, and thereby prevent accidental disengagement of the bolt from the crane. The bolt normally drops or falls by gravity, so that its head rests upon the crane-arm, thus disposing it out of the way of the front coupling-arch when the pair of beams is elevated. To throw the pair of beams out of active position—as, for instance, when turning at the end of a row or when traversing from one field to another—the operator lifts the handle-bar and through it the coupling-arches and the pair of beams. As the parts are raised the front coupling-arch passes over the arm of the crane, and the operator then lifts the suspension-bolt to the inclined position shown by Fig. 2, so that the bolt-head 47 rests against the coupling-arch. The weight of the beams, the arches, and the handle-bar rests upon the suspension-bolt, and the angular impingement of this bolt against opposite edges of the opening in the crane-arm prevents dislodgment of the bolt and insures the suspension of the beams in their inactive positions. To lower the beam, the operator lifts the handle-bar slightly in order to move the front arch free from the bolt and relieve the latter of the weight of the beams, and the bolt is thus free to drop through the opening 48, so that its head will rest on the crane-arm out of the path of the front arch, whereby the bolt automatically adjusts itself out of the path of the arch to permit the pair of beams to be lowered without manual manipulation of the suspension-bolt.

The two pairs of beams are disconnected or independent one from the other, so that they may be swung from side to side or raised and lowered without one pair of beams interfering with the other; but under certain conditions of service of the implement it is desirable to secure simultaneous adjustment of all the beams. To attain this end, I employ a coupling-rod 49 between the inner beams 25 26. One end of this coupling-rod is loosely attached to an eyebolt 50, which is secured firmly to the beam 25, while the other end of said rod is provided with a hook 51, which is fitted detachably in an eyebolt 52, secured firmly to the beam 26. It is evident that the rod 49 insures simultaneous adjustment of the two pairs of beams by engaging its hook with the eyebolt 52; but by disconnecting said hook from the eyebolt each pair of beams may be adjusted laterally or raised and lowered separately from the other pair of beams.

By extending the beam 26 beyond the rear end of the beam 25 and arranging the shovels on the two beams in staggered relation the rearmost shovels of the beams 25 26 are spaced to provide sufficient clearance-space between said shovels for the passage of trash which may accumulate in the path of the shovel.

Changes may be made in the form of some of the parts, while their essential features are retained and the spirit of the invention embodied. Hence I do not desire to be limited to the precise form of all the parts as shown, reserving the right to vary therefrom.

What I claim is—

1. In a cultivator, the combination with a crane, and a coupling-arch on the shovel-beams, of a suspension-bolt supported by the crane and arranged to drop out of the path of the coupling-arch when free from engagement therewith, substantially as described.

2. In a cultivator, the combination with a pair of beams united by a coupling-arch, of a crane, and a suspension-bolt loosely supported by the crane and arranged to engage with the coupling-arch to be held thereby in its active position under the weight of the beams, said suspension-bolt adapted to automatically move out of the path of the coupling-arch when free from the weight of the beam, substantially as described.

3. In a cultivator, the combination with a pair of beams united by the coupling-arches and having a handle-bar, of a crane provided with a perforated arm, and a suspension-bolt fitted loosely in the said perforated arm, substantially as described.

4. In a double-row wheel-cultivator, the combination with hangers, of pairs of beams connected to said hangers by swivel-couplings, the pairs of coupling-arches attached to pairs of beams, the handle-bars fastened to the pairs of coupling-arches, and a coupling-rod between the inner pairs of beams, substantially as described.

5. In a double-row cultivator, the combination of the hangers, shovel-beams attached to said hangers, a pair of coupling-arches adjustably fastened to two of the beams and serving to couple the latter in pairs, means whereby the pairs of coupled beams may be adjusted laterally and vertically, and a coupling-rod connected permanently to one of the inner pair of beams and detachably fastened to the other of the inner pair of beams, substantially as described.

6. In a double-row cultivator, the combination of the shovel-beams, 25, 26, a coupling-rod, 49, attached to the beam, 25, and having a hook to engage with an eyebolt on the beam, 26, the outer beams 30, 31, and the arches which couple the beams in pairs, substantially as described.

7. In a double-row cultivator, the combination with hangers, of the beams, 30, 31, the beams, 25, 26, said beam, 26, having its rear end extended beyond the beam, 25, and the shovels on said beams, the shovels of the beams, 25, 26, being in staggered relation to each other, substantially as described.

In testimony that I claim the foregoing as my own I have hereto affixed my signature in the presence of two witnesses.

PHILIP JARVIS.

Witnesses:
A. D. SMITH,
LEVI JARVIS.